(12) United States Patent
Eikelenberg et al.

(10) Patent No.: US 11,627,839 B2
(45) Date of Patent: Apr. 18, 2023

(54) PORTIONING DEVICE WITH INTERCHANGEABLE SCOOPS

(71) Applicant: Dart Industries Inc., Orlando, FL (US)

(72) Inventors: Ralph F. E. Eikelenberg, Gooik (BE); Antoon Keymeulen, Aalst (BE); Katelijne Daelman, Sint-Kornelis-Horebeke (BE); Judicaël Cornu, Schaerbeek (BE)

(73) Assignee: Dart Industries Inc., Orlando, FL (US)

( * ) Notice: Subject to any disclaimer, the term of this patent is extended or adjusted under 35 U.S.C. 154(b) by 530 days.

(21) Appl. No.: 16/938,314

(22) Filed: Jul. 24, 2020

(65) Prior Publication Data

US 2022/0022697 A1   Jan. 27, 2022

(51) Int. Cl.
*A47J 43/00* (2006.01)
*A47J 43/28* (2006.01)
*G01F 19/00* (2006.01)

(52) U.S. Cl.
CPC .......... *A47J 43/282* (2013.01); *G01F 19/002* (2013.01)

(58) Field of Classification Search
CPC ................................................... A47J 43/282
See application file for complete search history.

(56) References Cited

U.S. PATENT DOCUMENTS

| | | | | |
|---|---|---|---|---|
| 825,147 A * | 7/1906 | Mosteller | ............... | A47J 43/282 425/283 |
| 1,049,585 A * | 1/1913 | Honecker | ............. | A47J 43/282 D7/681 |
| 1,109,576 A * | 9/1914 | Gilchrist | ............... | A47J 43/282 425/285 |
| 1,508,915 A * | 9/1924 | Bidwell | ................ | A47J 43/282 425/221 |
| 1,712,042 A * | 5/1929 | Jockmus | ............... | A47J 43/282 425/285 |
| 1,829,442 A * | 10/1931 | Flegel | ................... | A47J 43/282 425/285 |
| 1,862,527 A * | 6/1932 | Cox | ...................... | A47J 43/282 425/285 |

(Continued)

OTHER PUBLICATIONS

Vollrath Disher 47400 Disher—Squeeze, Size 40; Aug. 1, 2019.
Vollrath 47388 Squeeze Disher with Orange Handle; Aug. 1, 2019.

*Primary Examiner* — Timothy Kennedy
(74) *Attorney, Agent, or Firm* — Taylor J. Ross

(57) ABSTRACT

A portioning device includes an integrated handle, actuating lever, and rack with teeth, with the handle having an aperture at the top. The rack is formed to be easily placed, and retained, in an initial position for assembly. One or more scoops are provided which may each be detachably connected the handle top end. A wiping blade may be detachably connected to the scoop for free rotation within the scoop. The wiping blade includes a shaft having a number of gear teeth, together with a camming surface leading to the first tooth on the shaft. Insertion of the scoop and wiping blade shaft into the handle aperture results in the first rack tooth acting as a camming surface and rotating the wiping blade to the proper clocking position with the first tooth of the shaft engaged with the first tooth of the rack. In this manner the number of component parts is reduced significantly, while at the same time allowing for re-use of the handle with the various interchangeable scoops.

10 Claims, 10 Drawing Sheets

(56) References Cited

U.S. PATENT DOCUMENTS

| | | | | |
|---|---|---|---|---|
| 2,013,265 | A | * | 9/1935 | Frank .................... A47J 43/282 425/221 |
| 2,427,095 | A | * | 9/1947 | Gordon ................ A47J 43/282 425/285 |
| 2,631,551 | A | * | 3/1953 | Lawrence ............. A47J 43/282 464/170 |
| 3,208,404 | A | * | 9/1965 | Schlessel ............. A47J 43/282 D7/681 |
| 3,784,341 | A | * | 1/1974 | Magalotti ............. A47J 43/282 425/280 |
| D262,684 | S | | 1/1982 | Daenen |
| D312,193 | S | * | 11/1990 | Cooper .......................... D7/681 |
| 5,000,672 | A | * | 3/1991 | Halimi .................. A47J 43/282 425/282 |
| D361,480 | S | * | 8/1995 | Cooper .......................... D7/681 |
| D371,283 | S | * | 7/1996 | Cooper .......................... D7/681 |
| D391,811 | S | | 3/1998 | Molo |
| 6,239,417 | B1 | * | 5/2001 | Vidmar ................ H05B 6/6494 219/730 |
| 6,416,309 | B1 | * | 7/2002 | Michlitsch ............ A47J 43/282 425/279 |
| D467,474 | S | | 12/2002 | Laib |
| 7,205,509 | B2 | * | 4/2007 | Goulet ................. A47J 43/282 219/521 |
| D575,999 | S | * | 9/2008 | Funka, Jr. ...................... D7/681 |
| D626,386 | S | * | 11/2010 | Cohen ........................... D7/681 |
| 2007/0292551 | A1 | * | 12/2007 | Taylor .................. A47J 43/282 425/276 |
| 2015/0382401 | A1 | * | 12/2015 | Dietz ....................... B26B 3/00 30/140 |

\* cited by examiner

PORTIONING DEVICE WITH INTERCHANGEABLE SCOOPS

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates in general to dispensing devices (sometimes called dishers, dippers, or scoops) having an oscillating wiper blade. It is well known to provide a dispensing device, such as an ice cream scoop, with an oscillating wiper to help separate the food from the concave scoop interior. A good example of this is U.S. Pat. No. 1,829,442A to Flegel, where a wiper blade within the scoop interior is oscillated by a gear which is turned by a pivoting lever arm which is spring-biased to return to the initial position. While this device performs well, it is complicated. For example, it requires multiple separate parts including a handle; a rod connected to the wiper; a gear secured to the rod; a thumb lever; a connector to pivotally attach the lever arm to the handle, a spring to bias the lever arm, all of which need to be assembled together. What is more, the wiper needs to be in a specific clocking orientation with respect to all of the scoop, gear and lever arm during this assembly for proper operation.

A later design, illustrated by the Vollrath Disher Model 47400, employs injection molding to simplify the product. Specifically, the handle, lever arm, lever connector, and the spring are all combined into one monolithic injection molded handle unit using elastic deformation of the plastic to act as the spring. While this is a significant improvement in reducing the number of parts, the wiper blade still requires a separate rod, and a separate gear mounted on the rod. As before, the clocking of the wiper blade requires a relatively complicated assembly process, with the thumb lever being held flexed to a specific position and the blade/gear similarly held to a specific position during assembly.

This Vollrath disher also illustrates another drawback in the prior art. This Vollrath disher is manufactured to dispense a specific quantity similar to a measuring spoon. As is known from measuring spoons, an entire set of different capacities is often needed. This noted Vollrath model is just one of many different capacities offered. A user desiring multiple different dispensing capacities would be required to purchase a number of discrete, complete, stand-along dishers to achieve this goal.

SUMMARY OF THE INVENTION

An object of the present invention is to provide a portioning device with oscillating wiping blade which has a reduced number of component parts.

Another object of the present invention is to provide a portioning device with oscillating wiping blade which allows for interchangeable scoops.

These and other objects are achieved by a portioning device with interchangeable scoops. The portioning device includes an integrated handle, actuating lever, and rack with teeth, with the handle having an aperture at the top. The rack is formed to be easily placed, and retained, in an assembly position. One or more scoops are provided which may each be detachably connected the handle top end. A wiping blade may be detachably connected to the scoop for free rotation within the scoop. The wiping blade includes a shaft having a number of gear teeth, together with a camming surface leading to the first tooth on the shaft. Insertion of the scoop and wiping blade shaft into the handle aperture results in the camming surface rotating the wiping blade to the proper clocking position with the first tooth of the shaft engaged with the first tooth of the rack. In this manner the number of component parts is reduced significantly, while at the same time allowing for re-use of the handle with the various interchangeable scoops.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
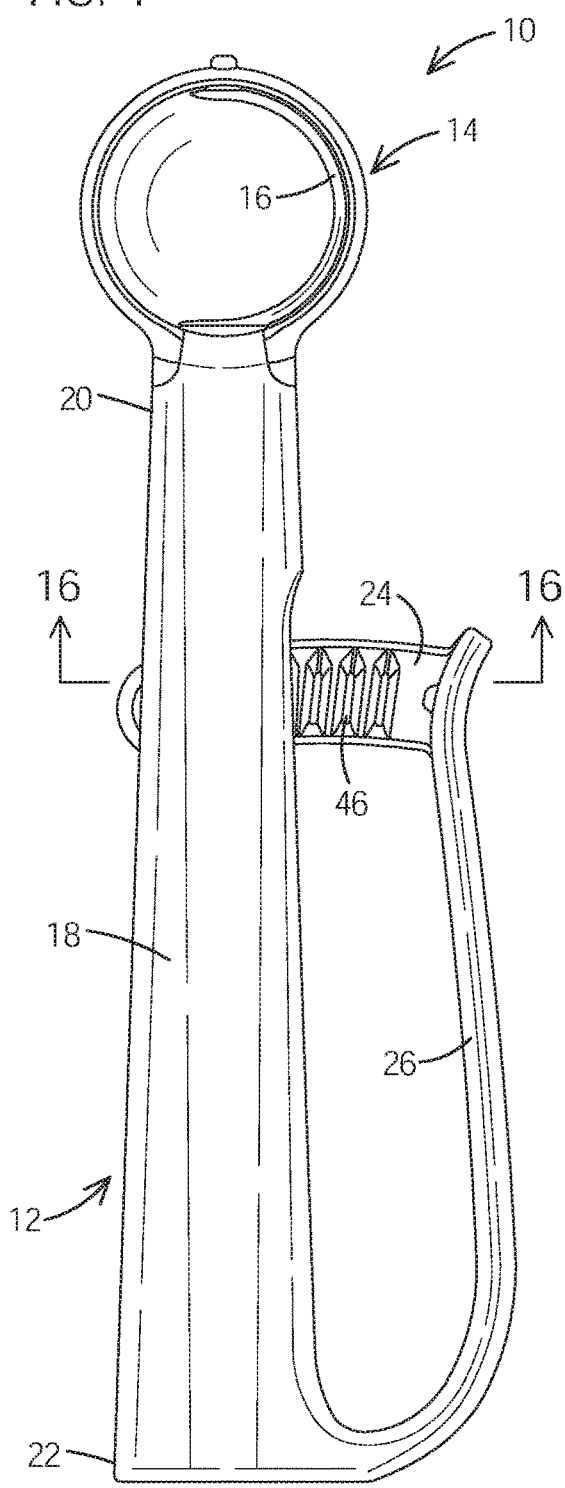
FIG. 1 is a front view of the portioning device according to the present invention in the operative configuration.
Figure 2:
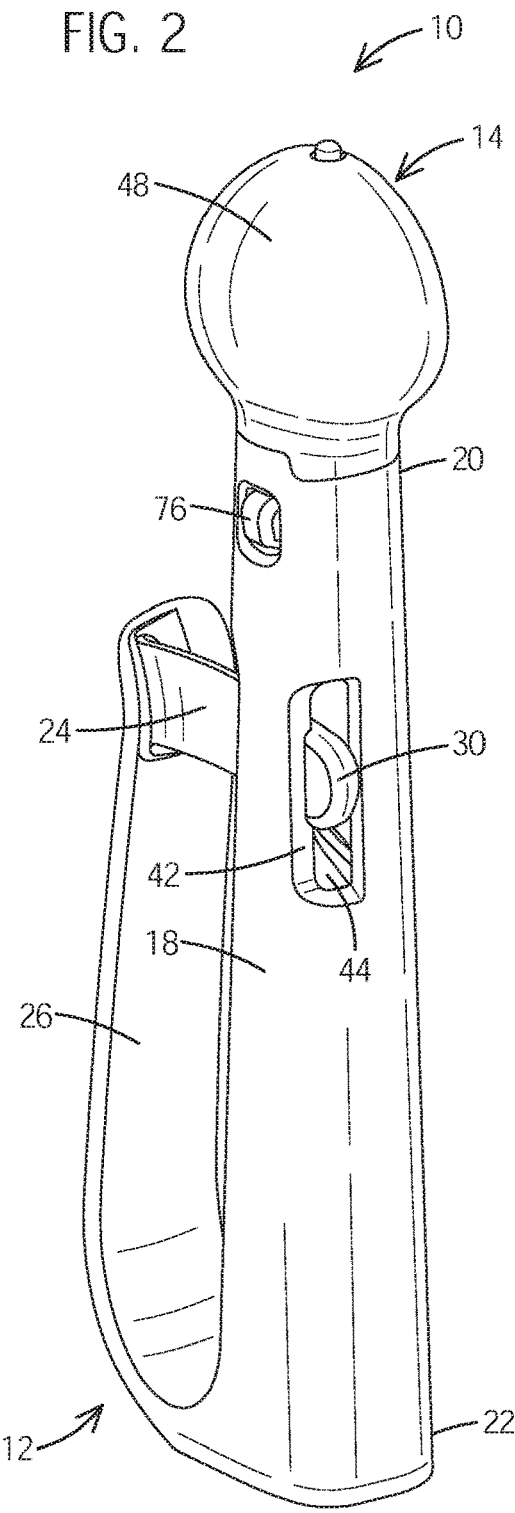
FIG. 2 is a rear, right top isometric view of the device of FIG. 1.

With reference to FIG. 1, a portioning device with interchangeable scoops according to the present invention is generally designated by reference numeral 10. The device 10 generally includes a handle unit 12, a scoop head 14, and a wiper unit 16. The handle unit 12, scoop head 14 and wiper unit 16 may be formed of a variety of materials including metal, ceramic, or (preferably) injection molded plastic. Comparing FIGS. 1-3, it may be seen that in general the wiper unit 16 combines with the scoop head 14, and these are together inserted into the handle unit 12.

The handle unit 12 includes an elongated handle 18 having a top end 20 and bottom end 22. Handle unit 12 further includes a rack 24 intended to engage with and oscillate the wiper unit 16 as described below. The rack 24 is connected to the handle 18 in a manner for relative movement of the rack 24 with respect to the handle 18. This may take a variety of arrangements as known in the art. The preferred arrangement is that handle unit 12 includes a lever arm 26 arranged for pivoting with respect to the handle 18. The pivot point for the lever arm 26 may be at or near the top end 20, but it is preferred to be at or near the bottom end 22, as shown. It is also preferred that the lever arm 26 be biased toward an initial position by a spring. The pivot point for the lever arm 26 could be an actual joint, but it is preferred that the handle 18, lever arm 26, and rack 24 be formed as a monolithic unit of a plastic, such that the elasticity of the plastic forms both the pivot point and the biasing spring within a portion or segment of the lever arm 26 itself.

Figure 3:
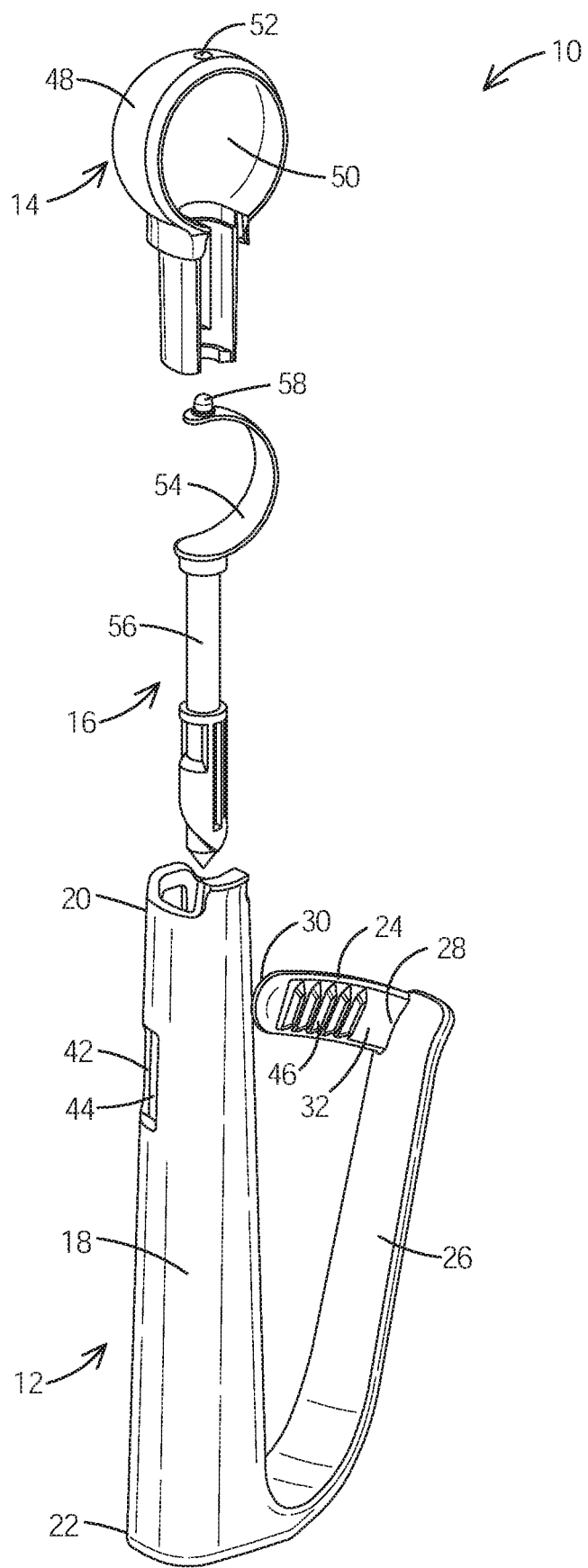
FIG. 3 is an exploded front, right, top isometric of the device in an uncompressed position.
Figure 4:
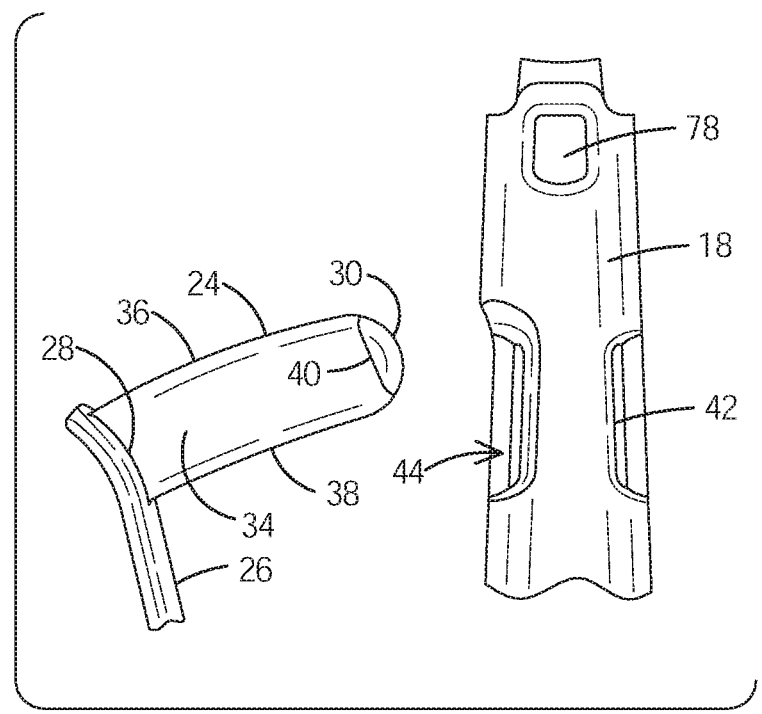
FIG. 4 is a detail rear view in an uncompressed position.
Figure 5:
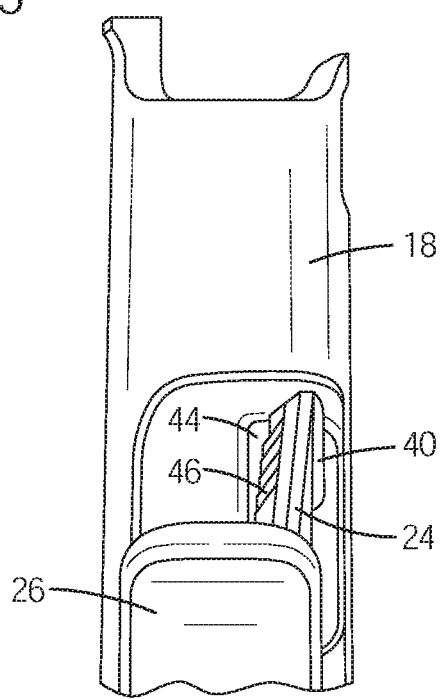
FIG. 5 is a detail left view in an uncompressed position.
Figure 6:
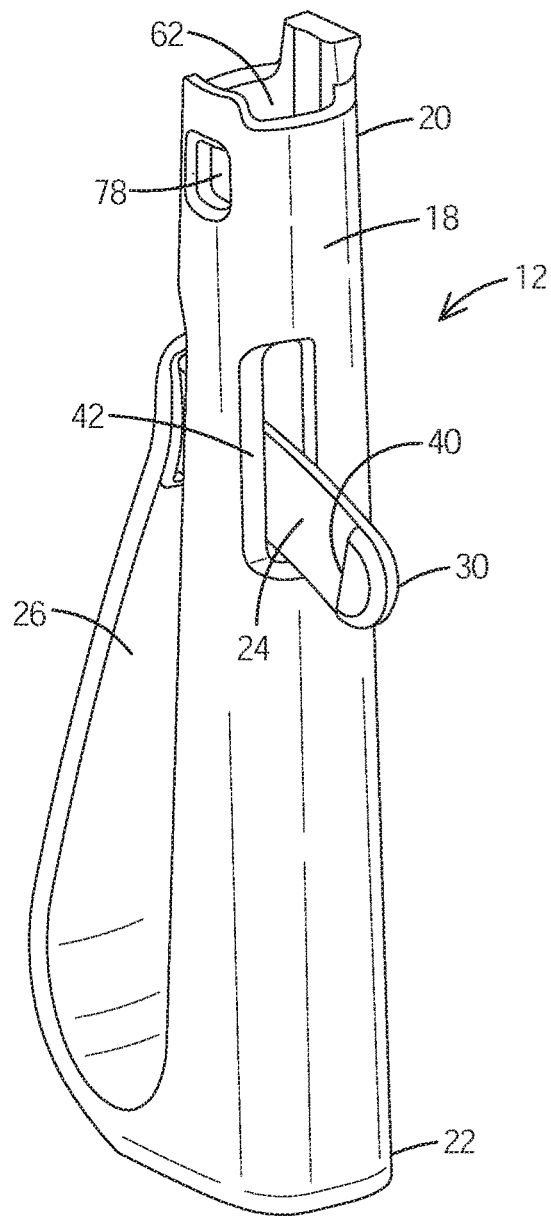
FIG. 6 is a rear, top, right isometric view of a handle unit in a compressed, final position.

As may be envisioned, in this preferred monolithic form the manual compression of the lever arm 26 toward the handle 18 shown in FIG. 6 causes internal stress such that once manual compression is removed, the lever arm 26 would naturally spring back toward the original uncompressed position shown in FIGS. 3-5. This preferred arrangement is quite similar to the Vollrath disher discussed above. As may be seen, this preferred arrangement allows the handle unit 12 to be molded as a single unit having a shape as shown in FIG. 3. To allow molding of the rack 24, the lever arm is molded in this uncompressed position with the rack 24 spaced from the handle 18.

As is known in the art, the rack 24 will engage with the wiper unit 16 for operation, with the rack 24 and wiper unit 16 moving repeatedly between an initial position and a final position as is known in the art to help remove food from the device 10. Maintaining the rack 24 (which is biased) and wiper unit 16 in the proper relative positions for assembly has been difficult. The present invention improves over the prior art in this respect. In particular, the lever arm 26 and rack 24 may be placed in an initial position quickly and reliably.

As shown in FIGS. 3-5, the rack 24 is elongated, extending between a first end 28 and a second end 30, with the first end 28 being connected to the lever arm 26. In this preferred embodiment the rack 24 is cantilevered from the lever arm 26, such that second end 30 is a free end. The rack further includes first and second faces 32 and 34, respectively, as well as first and second edges 36 and 38, respectively. At least one of these first and second faces and edges 32-38 will form a detent 40. In the embodiment shown, it is the second face 34 which includes the detent 40 to arrest motion of the rack 24, and thus the lever arm 26 between a compressed position (FIG. 6) and the uncompressed position (FIGS. 3-5).

The detent 40 will engage with the handle 18, and in particular a stop edge 42 on the handle 18. In the preferred embodiment, the handle 18 will include a rack slot 44 sized to receive the rack 24 for sliding therethrough. The end of this rack slot 44 furthest from the lever arm 26 will form the stop edge 42. It is preferred that the rack 24 be biased toward engagement of the detent 40 with the stop edge 42, but to also allow disengagement. Just as the lever arm 26 employs the elastic properties of its molded plastic material, so does the rack 24. With reference to FIG. 5, the rack 24 is initially formed so that in the uncompressed position of lever arm 26 the rack 24 is offset from the rack slot 44 in a direction toward engagement of the detent 40. As may be envisioned, in the uncompressed position (FIGS. 3-5) the rack 24 will be fully or partially blocked from entering the rack slot 44, but rack 24 may be elastically deformed into alignment with the rack slot 44. This will allow entry of the rack 24 into the rack slot 44. This may be assisted by forming the appropriate portion of the second end 30 with a taper to guide insertion.

Figure 7:
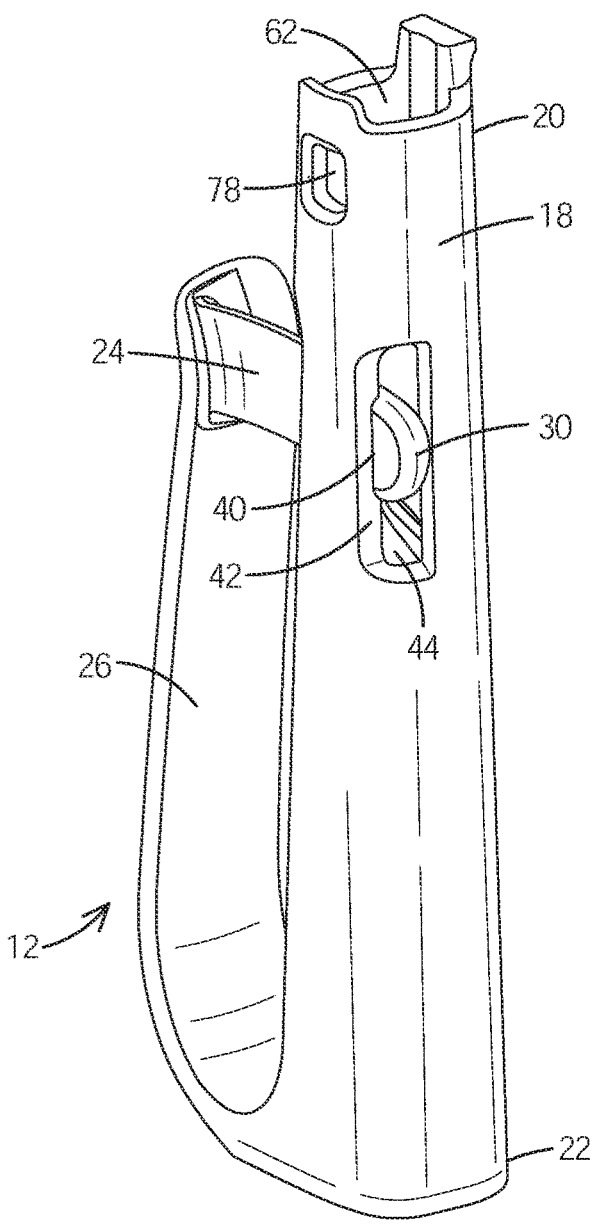
FIG. 7 is a rear, top, right isometric view of a handle unit in an initial position.

In this manner the handle unit 12 may be changed from the uncompressed position to the initial position, and be easily and reliably retained in this initial position for further assembly or disassembly. This change into the initial position is best illustrated with reference to FIGS. 3-7. To ready the handle unit 12 for further assembly of the portioning scoop 10, a handle unit 12 in the uncompressed position of FIGS. 3-5 will have the rack 24 elastically deformed into alignment with the rack slot 44. The lever arm 26 will then be elastically compressed toward the handle 18 to thus cause the rack 24 to enter and then pass through the rack slot 44 such that the second end 30 exits the rack slot 44, and more particularly, so that the detent 40 moves beyond the stop edge 42. This is illustrated in FIG. 6, and is the compressed position. At this point the deformation of the lever arm 26 may cease, such that the elastic nature causes the lever arm to move back toward the uncompressed position. This movement is halted, however, when the detent 40 engages with the stop edge 42. This is advantageously designed to be the initial position, as shown in FIG. 7. This initial position is maintained throughout the assembly and disassembly process, and as such this initial position is shown in FIGS. 16-19 as well.

As is known in the art, the rack 24 will include a plurality of rack teeth 46. While variations are possible, in the preferred embodiment shown each one of the teeth is located on the first face 32, and is oriented approximately parallel to a longitudinal axis of the handle 18, when the particular one of the rack teeth 46 is adjacent such longitudinal axis. To achieve this with the oscillating nature of the lever arm 26, the rack teeth 46 may actually be formed in a slight radial pattern as shown. The rack teeth 46 are arranged along a portion of the length of the rack 24 between the first and second ends 28 and 30.

The rack 24 with its rack teeth 46 will drive the wiper unit for oscillation within the scoop head 14, in a manner known in the art. In particular, the scoop head 14 includes a generally hemispherical scoop bowl 48 having an inner surface 50. It is preferred that the scoop head 14 further include an axle arrangement to support the wiper unit 16. In the embodiment shown this is achieved by a pin recess 52. As shown, the pin recess 52 extends entirely through the scoop bowl 48, but a simple depression could be used instead. The scoop head 14 is secured to the top end 20 of handle 18 by any appropriate arrangement. The wiper unit 16 includes a wiper blade 54 extending from a wiper rod 56. The wiper blade 54 has an arcuate form which will closely conform to the inner surface 50 of scoop bowl 48. A free end of the wiper blade 54 has a support pin 58 extending therefrom, and intended to be received within the pin recess 52. As may be envisioned, the relationship could be reversed, with the pin extending from the inner surface 50 and the wiper blade including a recess to receive the pin. With the support pin 58 received in the pin recess 52, the scoop head 14 and wiper unit 16 will take the configuration shown in FIGS. 14 and 15.

Figure 16:
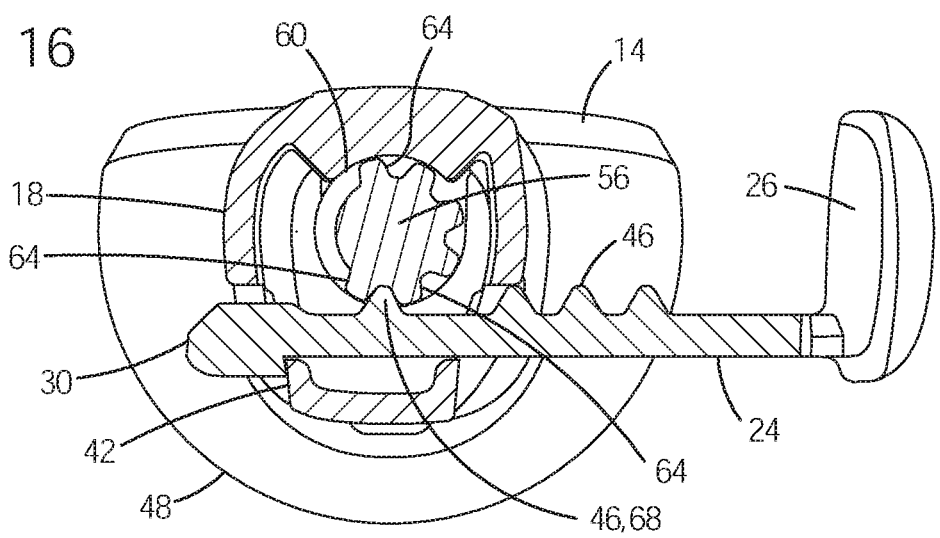
FIG. 16 is a cross-sectional view a long line 16-16 of FIG. 1.

In this configuration the wiper rod 56 will extend from the inner surface 50 toward the handle 18. The wiper rod 56 has a length such that when the scoop head 14 is secured to the handle 18, the wiper rod 56 will extend at least to the rack 24. The handle 18 will include support means 60 for maintaining the wiper rod 56 in alignment with the axis of handle 18 while facilitating oscillation of the wiper rod 56. This support means may take many forms, such as a recess or aperture (not shown) which receives the free end of the wiper rod 56. In the embodiment shown, the handle 18 includes a handle aperture 62 extending into the top end 20 of handle 18 (and forming the handle aperture 62 through the entire length of handle 18 may be preferred), and this handle aperture will receive the wiper rod 56. In this arrangement the support means 60 takes the form of an arcuate portion of this aperture sized to engage a portion of the outer surface the wiper rod 56 as shown in FIG. 16.

The wiper rod 56 will include a plurality of rod teeth 64 extending longitudinally and at a position to engage with the rack teeth 46 when the scoop head 14 is secured to the handle 18. These rod teeth 64 could be formed as a separate element mounted to the wiper rod 56, but in the preferred form the entirety of wiper unit 16 is formed monolithically (such as by casting or injection molding) with the rod teeth 64 therefore formed monolithically with the wiper rod 56. The rack teeth 46 and rod teeth 64 have a mating pitch and tooth thickness to act as a rack and pinion arrangement, such that the linear movement of the rack 24 will cause rotation of wiper rod 56. The rod teeth 64 are located about the circumference of wiper rod 56 for proper operation. In particular, so that reciprocation of the rack 24 between the initial position of FIG. 1 and the final position of FIG. 6 will cause an oscillation of the wiper blade 54 across the scoop bowl 48 between the initial position of FIG. 1 to the final position of FIG. 17

The rod teeth 64 are positioned about the circumference of the wiper rod 56 so as to engage with the rack teeth 46 between the initial and final positions. The circumferential positioning of the rod teeth 64 compared to the orientation of the wiper blade 54 will vary depending upon whether the rack 24 is positioned in front of or behind the wiper rod 56, and the angular orientation of the scoop head 14 with respect to the handle unit 12. Further, the circumferential extent of the rod teeth 64 will depend upon the angular oscillation desired for the wiper unit 16 (typically about 180 degrees, but this can vary considerably if desired). Regardless of these variables, there will always be the initial position for the rack 24 and wiper unit 16 and this will correspond with a specific engagement between the rack teeth 46 and rod teeth 64 referenced as the initial engagement position. In the embodiment shown, the rack 24 is behind the wiper rod 56, and the scoop head 14 is oriented directly forward with no angular offset, and the angular oscillation is about 180 degrees. As such, in the embodiment shown and with reference to FIGS. 10-13, the rod teeth 64 extend about the circumference of wiper rod 56 about 180 degrees starting from the orientation of FIG. 11, through the orientation of FIG. 12 and ending at the orientation of FIG. 13. For this embodiment shown, the initial engagement position for the teeth 46 and 64 is shown in FIG. 16.

During assembly of the portioning device 10, the rack 24 and wiper unit 16 must be retained in relative positions to cause the rack teeth 46 and rod teeth 64 to become engaged so as to be in (or to later achieve) the initial engagement position. The present invention as described above will simplify assembly of the portioning device 10. The use of the detent 40 and stop edge 42 will hold the rack 24 in the initial position with no further action required. The scoop head 14 with wiper unit 16 then may be assembled to the handle unit 12 with the wiper unit 16 held in it's similar initial position. The number of components requiring active positioning during assembly is halved.

While this improvement simplifies assembly, additional changes may simply assembly of portioning device 10 even more. Specifically, it is possible to eliminate the need for actively orienting the wiper unit 16. The wiper unit 16 may be formed in a manner such that it will automatically position itself during assembly into the initial position.

This improvement is achieved by forming a cam surface 66 one of the handle unit 12 and wiper unit 16, and forming a cam follower 68 on the other of the handle unit 12 and wiper unit 16. The cam surface 66 and cam follower will interact during assembly of the wiper unit 16 to the handle unit 12 in a manner to force the wiper unit 16 to assume a specific angular orientation relative to the handle unit 12. This orientation is such that upon completed assembly the rack teeth 46 and rod teeth 64 become engaged in (or will later achieve) the initial engagement position. By "will later achieve" it is meant that the teeth 46 and 64 are first engaged at a position other than the initial engagement position, but that upon the rack 24 and wiper unit 16 moving to their initial position the meshed teeth 46 and 64 will also achieve their initial engagement position. As an example (not shown), during assembly both the rack 24 and wiper unit 16 are in the final position, and later movement of the rack 24 and wiper unit 16 to the initial position will cause the engaged teeth 46 and 64 to move together to the associated initial engagement position. For ease of description, both cases where the rack teeth 46 and rod teeth 64 are 1) first engaging in the initial engagement position, or 2) later achieving the initial engagement position through meshed movement, are encompassed by the common term "meshed for the initial engagement position".

In the preferred embodiment shown, the wiper rod 56 extends beyond the lower extent of the rod teeth 64 and the free end may be pointed to ease insertion of the wiper rod 56 into the handle aperture 62. The cam surface 66 is best illustrated in FIGS. 10-13 as a ledge extending radially outward from the wiper rod 56 between the free end and the rod teeth 64. In this preferred form the cam surface 66 includes an inflection point 70 at its furthest point from the rod teeth 64 and located circumferentially opposite to (i.e., 180 degrees from) the initial engagement position for rod teeth 64.

Figure 11:
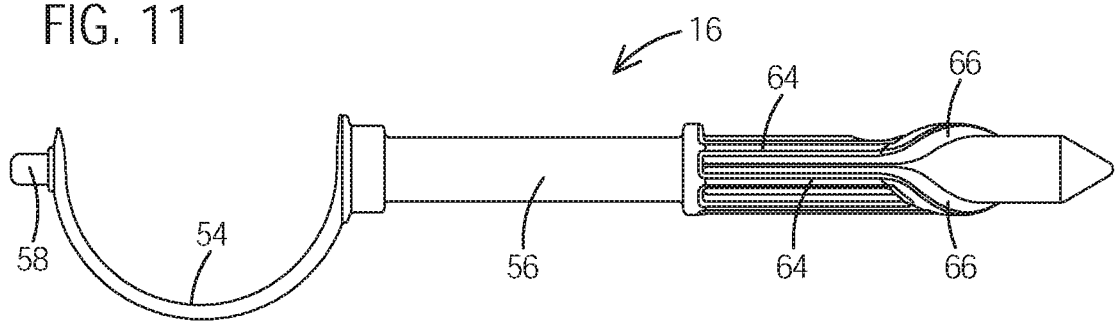
Figure 12:
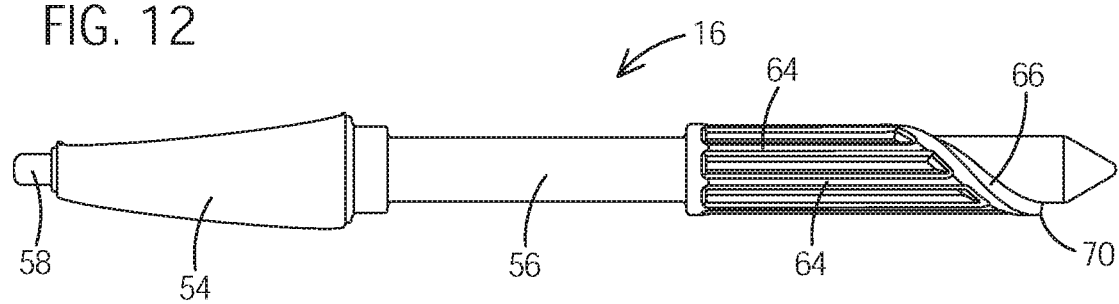
Figure 13:
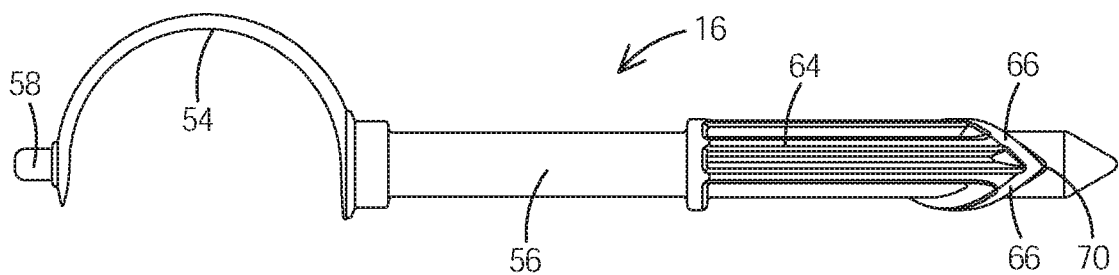

From this inflection point 70, the cam surface 66 extends in both circumferential directions toward the lower end of the rod teeth 64. As may be seen, each side of the cam surface 66 forms a smooth inclined helical path toward the teeth 64. Further, as best shown in FIGS. 11 and 13 each side of the cam surface 66 transitions smoothly into a different one of two adjacent rod teeth 64. Conversely, the space between the two sides of the cam surface 66 narrows directly transitions into the bottom land between those two adjacent rod teeth 64. To complete the pair, the cam follow 68 is formed by the first rack tooth 46 adjacent the rack second end 30.

From FIG. 1 it may be seen that a front view of the initial position of the wiper unit 16 will correspond to FIG. 13. Conversely, a rear view of the wiper unit 16 (where the wiper rod 56 will engage with rack 24) is shown in FIG. 11. From this it may be seen that in the initial position the inflection point 70 will be circumferentially opposite to the rack 24. Further, in this initial position the bottom land between the rod teeth 64 to which the ends of cam surface 66 lead will circumferentially adjacent the rack 24 to receive the first rod tooth 6.

With this arrangement, the rotational orientation of the wiper unit 16 will automatically assume the initial position during assembly. Further, the teeth 46 and 64 will automatically become meshed for the initial engagement position. This assembly and automatic orientation process will be described.

The initial step is to combine the scoop head 14 with wiper unit 16 so that both may be assembled as a sub-assembly to the handle unit 12. Comparison of FIGS. 3, 14 and 15 will show that the wiper blade 54 is brought toward the scoop bowl 48 and the support pin 58 is inserted into the pin recess 52. Note that the wiper blade 54 may be received within the scoop bowl 48 at this time, but this is not required—the wiper unit is self-aligning. This may be sufficient to begin assembly to the handle unit 12 depending upon the level of connections between the scoop head 14 and wiper unit 16.

Figure 8:
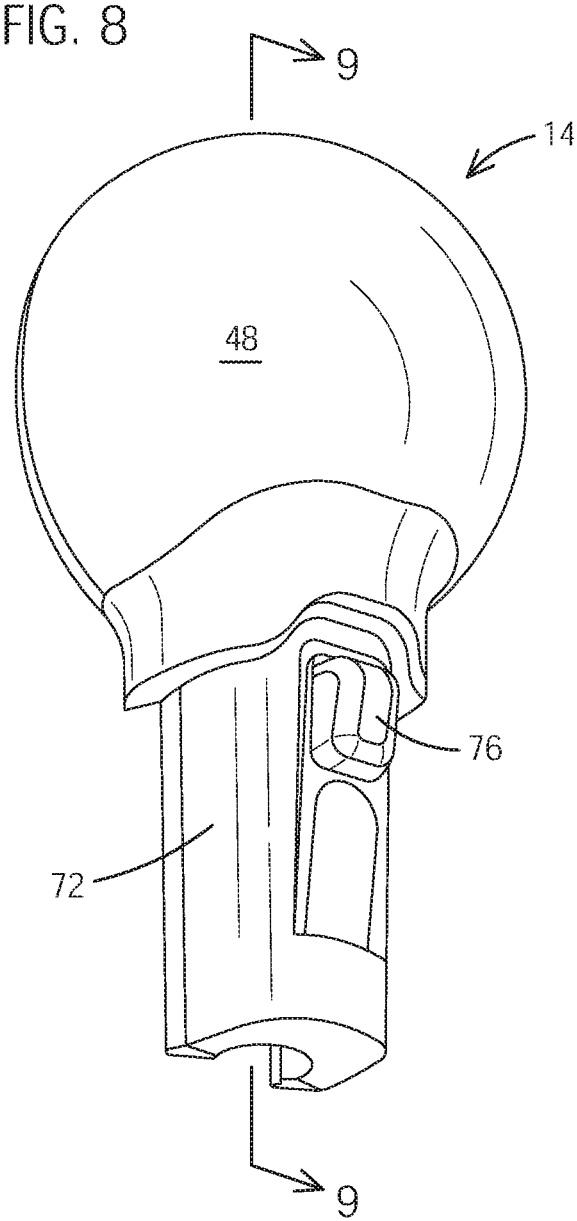
FIG. 8 is a rear, bottom, right isometric view of a scoop head.
Figure 14:
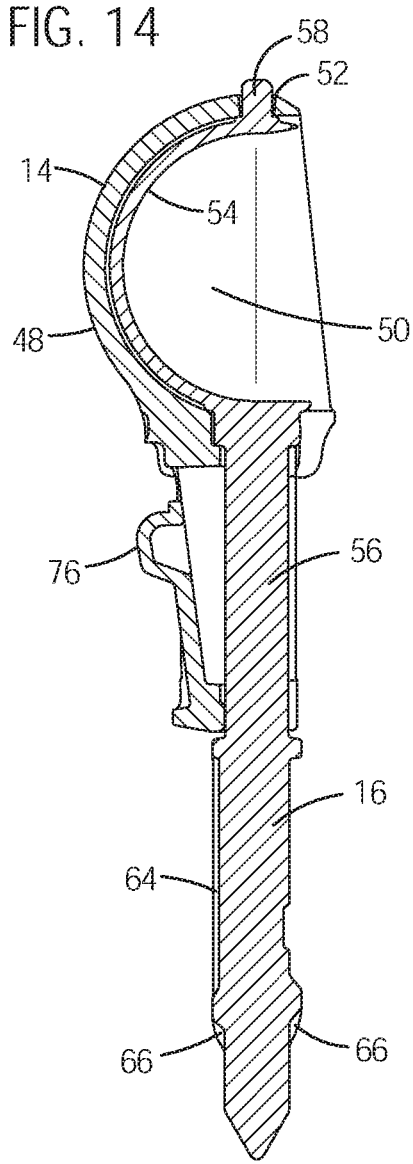
FIG. 14 is a front, top, right isometric view of a scoop head and wiper unit subassembly.
Figure 15:
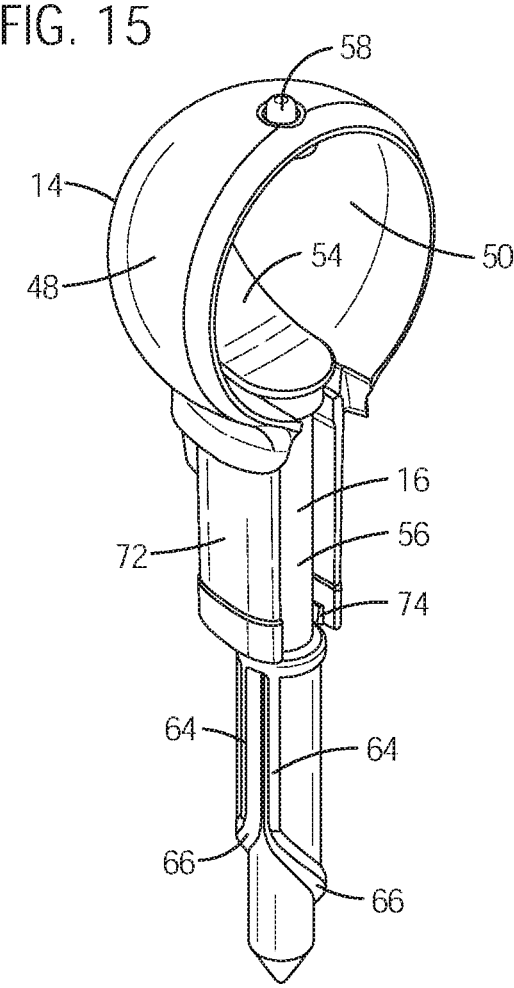
FIG. 15 is a cross-sectional view a long line 15-15 of FIG. 14.

In the preferred embodiment, the scoop head 14 includes a support neck 72 extending downward from the scoop bowl 48, and taking a U-shaped cross-section (FIG. 8) sized to receive the wiper rod 56. The support neck may include a snap connector 74 to secure the wiper rod within the support neck yet still allow rotation of the wiper unit 16. This sub-assembly of the scoop head 14 and wiper unit 16, as illustrated in FIGS. 14 and 15 is then assembled to the handle unit 12. The handle unit 12 has already had the rack 24 inserted into the rack slot 44 and the rack 24 is in the initial position of FIG. 7.

Figure 17:
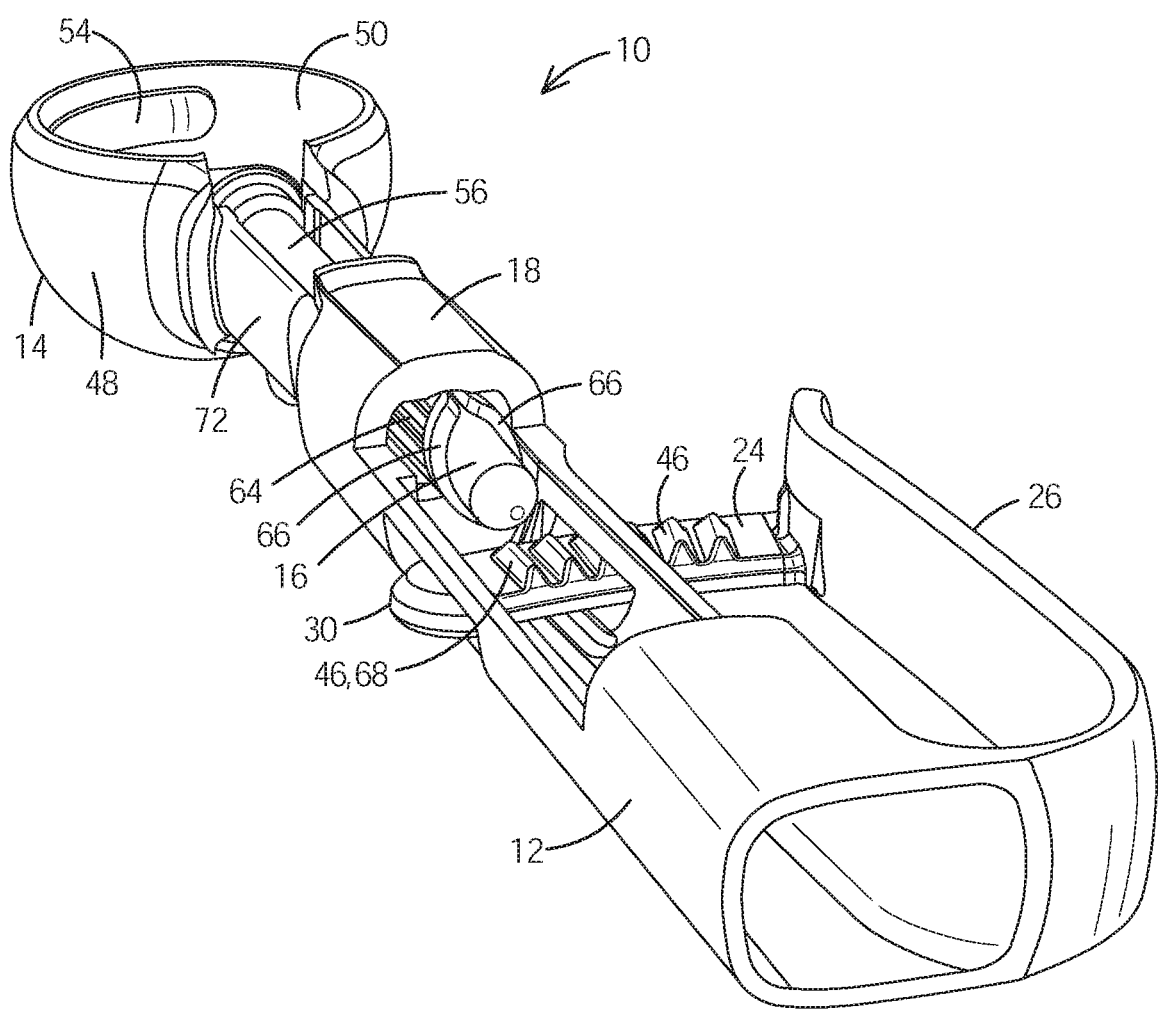
FIGS. 17-19 are front, bottom, right views with partial cut-away illustrating the assembly of the subassembly to the handle unit.
Figure 18:
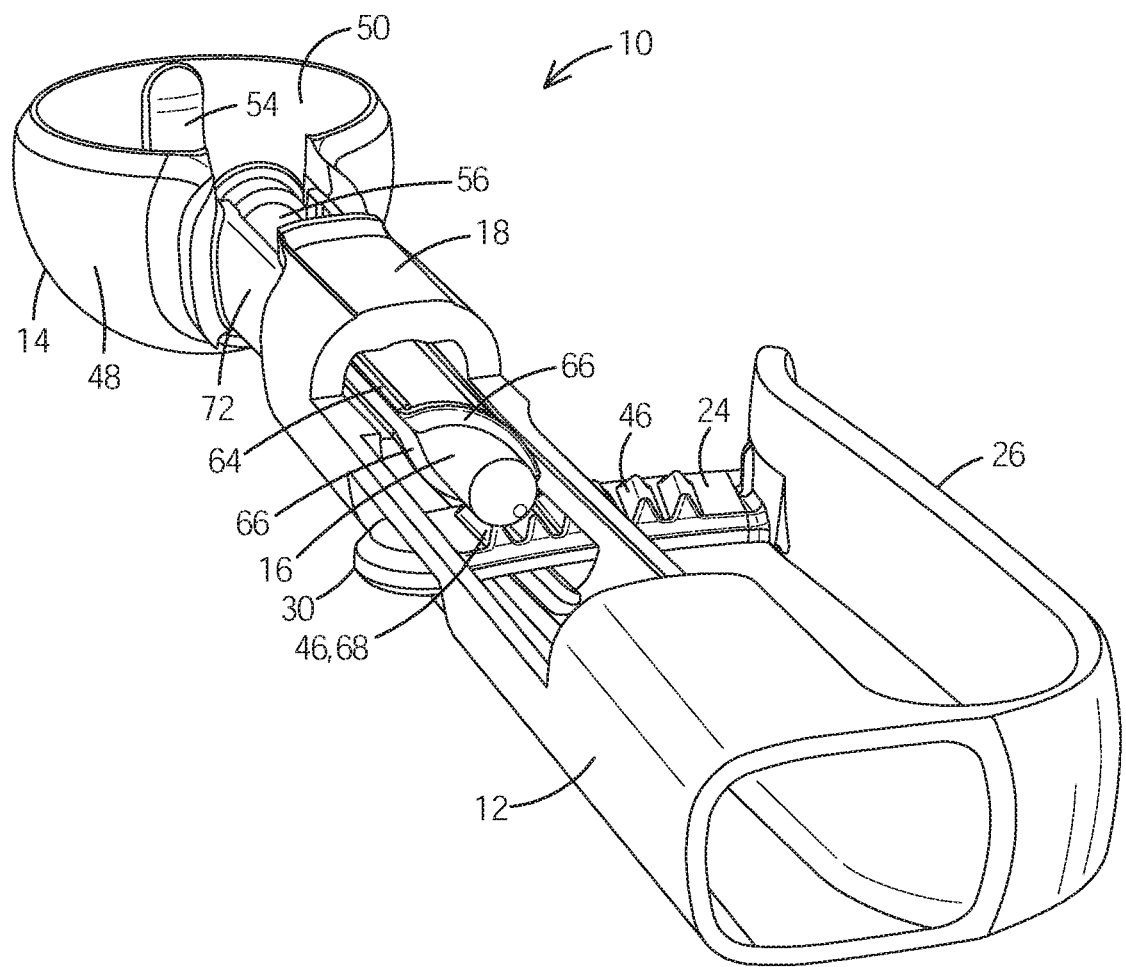
Figure 19:
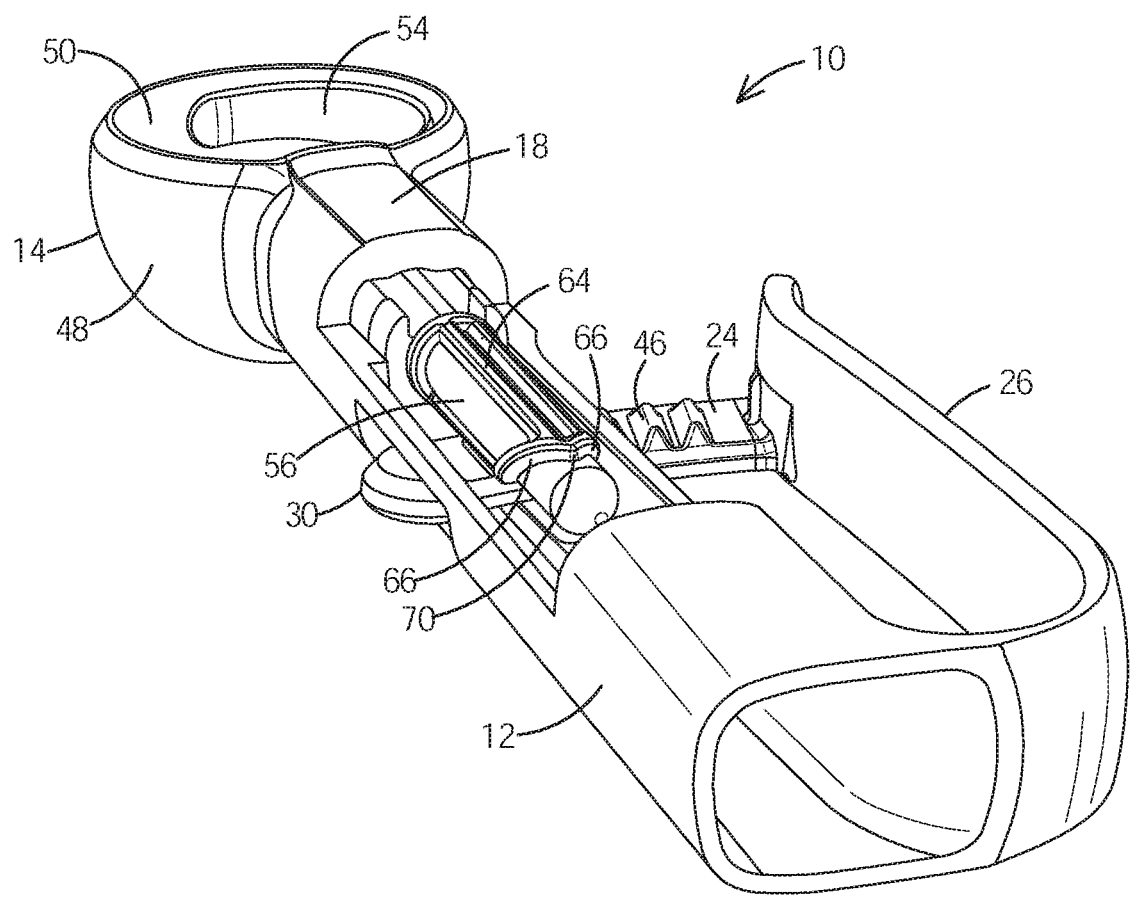

This final assembly is illustrated in FIGS. 17-19. FIG. 17 illustrates the wiper rod 56 being initially inserted into the handle aperture 62, with the free end of the wiper rod 56 moving toward rack 24. It is noted that the rack 24 is already in the initial position (due to detent 40) and as such the first tooth 46 acting as cam follower 68 is in the initial position. It is also noted that the wiper unit 16 is not in the initial position, but is in fact somewhere close to 180 degrees off with the wiper blade 54 opposite the initial position. While not visible, the inflection point 70 will be generally aligned with the cam follower 68.

As such, continued insertion of the wiper rod 56 will cause the cam surface 66 to abut the cam follower 68. Due to the pointed nature of inflection point 70, this abutment will be to one side or the other of the inflection point 70 along one of the two halves of cam surface 66. With the cam follower 68 abutting the cam surface 66, continued insertion of the wiper rod 56 will cause the wiper unit 16 to rotate as the cam surface 66 rides over the cam follower 68. This is illustrated in FIG. 18, where the interaction between the cam surface 66 and cam follower 68 has caused the wiper unit 16 to rotate 90 degrees (counter-clockwise viewed into the page). The wiper blade 54 has rotated into the scoop bowl 48 in this example. However, had the inflection point 70 been placed differently, then the cam follower 68 could have abutted the other half of the cam surface 68. In this situation, the continued insertion would again cause rotation of the wiper unit 16, but in the opposite direction. With this opposite rotation (not shown) the wiper blade 54 would extend out of the scoop bowl 48, essentially 180 degrees from the position of FIG. 18.

Continued insertion of the wiper rod 56 will result in continued relative movement of the cam follower 68 longitudinally along the length of wiper rod 56 away from the free end and toward the rod teeth 64. Due to the inclined form of the cam surface 66, the static cam follower 68 will cause further rotation of the wiper rod 56, up to the point where cam follower 68 reaches the upper longitudinal end of the cam surface 66. At this point, the wiper rod will have rotated to the initial position shown in FIG. 19. To complete assembly of the wiper rod 56, insertion is continued further, but now the cam follower 68 (which in this embodiment is also the first of rack teeth 46) is longitudinally beyond the cam surface 66 and slides into the bottom land formed between the first pair of rod teeth 64. When this first rack tooth 46 is fully received between the first two of the rod teeth 64 then insertion of wiper rod 56 is complete. At this point the teeth 46 and 64 are meshed for the initial engagement position. Further, in this particular embodiment, the teeth 46 and 64 are already in the initial engagement position without the need for any further meshed movement. At this point the scoop head 14 may be secured to the handle unit 12 to complete assembly of the portioning device 10. As may be seen, manual movement of the lever arm 26 between the initial and final positions will in turn cause oscillation of the wiper blade 54 between the initial and final positions.

The particular arrangement shown and described is believed to be simple, easily manufactured and easily assembled. May other arrangements are possible to achieve similar results. The cam surface 66 could instead be formed as a single helix (not shown), with an angular extent greater than 180 degrees such that cam follower 68 will engage it at some point during insertion of the wiper rod 56. The cam follower 68 could instead be formed by a fixed protrusion (not shown) on the handle 18 extending into the handle aperture 62. The cam surface 66 could be closest to the wiper blade 54, while rod teeth 64 are closest to the free end of wiper rod 56 (not shown). The cam surface 66 could be formed on the handle 18, with the cam surface 66 formed on the wiper rod 56 (not shown). The possible variations are further increased if the wiper rod 56 is supported by the handle unit 12 in a manner similar to the Volrath disher. A great deal of variety is possible on the basic concept of a cam surface and cam follower causing automatic orientation of the wiper unit 16 during insertion.

The use of the detent 40 to hold the rack 24 in position will ease assembly of the portioning device 10. The use of the cam surface 66 and cam follower 68 to automatically align the wiper unit 16 during insertion will also ease assembly. When combined, these features actually ease assembly to the point that it may be easily performed even by someone with no special skills. This improved ease of assembly opens up a new possibility for portioning scoops: a reusable handle unit with replaceable/interchangeable scoop heads and wipers.

To fully achieve this, however, the method of securing the scoop head 14 to the handle 18 must be of a type suitable for unskilled operators, as well as selectively removable. The prior art has secured the scoop head to the handle via welding, adhesives, hidden detents, etc. These methods are not suitable for interchangeable scoop heads and wipers.

Figure 9:
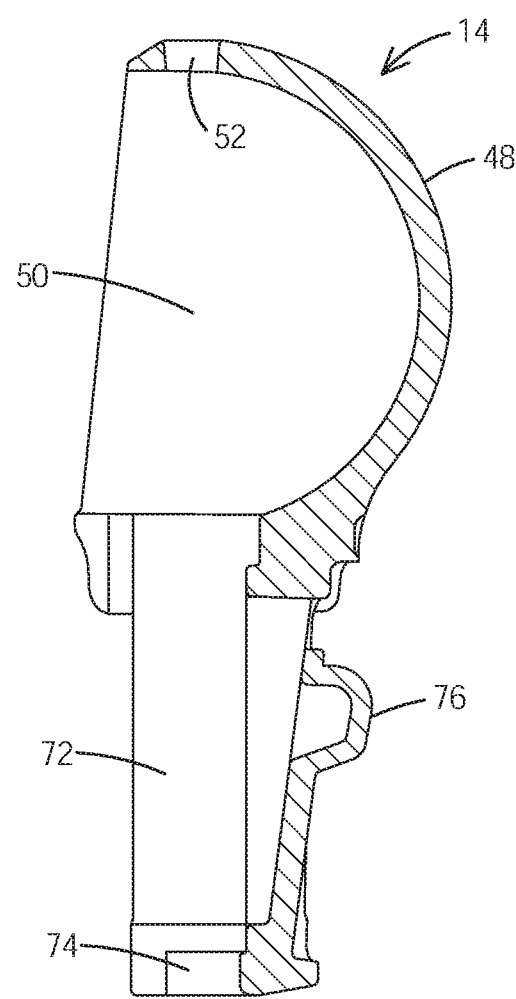
FIG. 9 is a cross-sectional view a long line 9-9 of FIG. 8.
Figure 10:
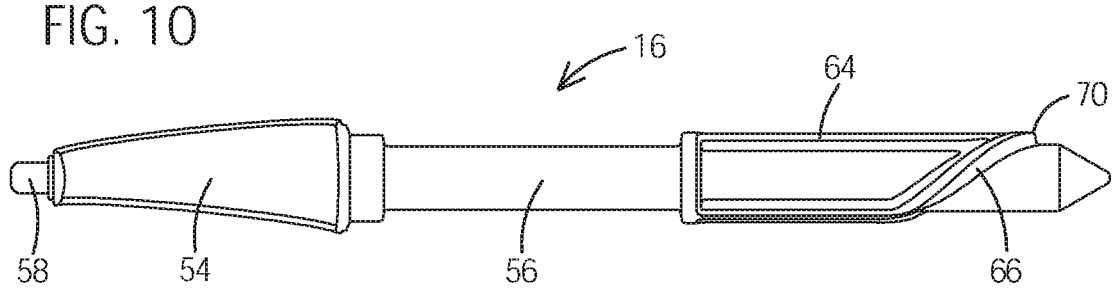
FIGS. 10-13 are respectively left, rear, right and front views of a wiper unit.

In the preferred form shown, the support neck 72 of the scoop head 14 has a portion sized to be closely received within the handle aperture 62. The support neck 72 further includes an elastic scoop release button 76 biased to extend radially outward from the support neck 72, but capable of flexing radially inward. The scoop release button 76 is preferably formed as a monolithic extension of scoop head 14 as shown in FIG. 9. The handle 18 includes a button aperture 78 positioned for alignment with the scoop release button 76 when the scoop head 14 is in the mounting position on the handle unit 12.

During insertion of the support neck 72 into the handle aperture 62, the scoop release button 76 will be biased radially inward by the close fit within the handle aperture. Continued insertion of the scoop head 14 (which corresponds with the insertion required for automatic orientation of the wiper unit 16) will bring the scoop release button 76 into alignment with the button aperture 78. This alignment will allow the scoop release button 76 to flex outward such that the scoop release button 76 extends into the button aperture 78 acting as a detent to secure the scoop head 14 to the handle 18. As may be envisioned, this is a selective attachment, and manually pressing the scoop release button 76 inward will release the detent and allow the scoop head 14 to be removed from the handle 18. Various other arrangements are available for releaseably securing the scoop head 14 to the handle 18, such as a bayonet attachment, threads, etc. These are collectively referenced as means for releaseably securing the scoop head to the handle.

This arrangement will allow a single handle unit 12 to be used with a variety of scoop heads 14 and associated wiper units 16, with each of the scoop heads 14 having a different capacity. In this manner the user may enjoy a full set of portioning scoops of differing capacities while reusing the handle unit to reduce cost. Further, it is easy to disassemble the various components for cleaning, and easy to reassemble in the desired configuration.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A portioning device, comprising:
   a handle unit including a handle, a lever arm articulated to said handle, and a rack connected to said lever arm such that movement of said lever arm will cause movement of said rack relative to said handle between initial and final positions, and wherein said rack is biased toward said initial position;
   a scoop head including a scoop bowl, said scoop head being secured to said handle;
   a wiper unit including a wiper blade intended to oscillate within said scoop bowl between initial and final positions, and a wiper rod;
   said rack and said wiper rod engaging each other such that movement of said rack between said initial and final positions will cause oscillation of said wiper rod between said initial and final positions, such engagement of said rack and said wiper rod in said initial positions being an initial engagement position;
   the improvement comprising one of said handle unit and said wiper unit having a cam follower thereon, and the other of said handle unit and said wiper unit having a cam surface thereon, said cam follower and said cam surface arranged to engage each other during movement of said wiper unit toward said handle unit for assembly, causing said wiper unit to rotate with respect to said handle unit such that upon completed assembly of said wiper unit to said handle unit, said wiper rod and said rack are meshed for said initial engagement position.

2. A portioning device as in claim 1, wherein said rack includes rack teeth, and said wiper rod includes rod teeth, and said engagement between said rack and said wiper rod is engagement of said rack teeth and said rod teeth.

3. A portioning device as in claim 2, wherein said cam follower is on said handle unit, and said cam surface is on said wiper rod.

4. A portioning device as in claim 3, wherein in said cam follower is one of said rack teeth, and wherein said cam surface leads to a bottom land between two of said rod teeth.

5. A portioning device as in claim 1, wherein in said rack includes a detent, and said handle includes a stop edge, said detent and said stop edge being arranged such that when said detent is abutting said stop edge, said rack is in said initial position.

6. A portioning device as in claim 5, wherein said rack includes rack teeth, and said wiper rod includes rod teeth, and said engagement between said rack and said wiper rod is engagement of said rack teeth and said rod teeth.

7. A portioning device as in claim 6, wherein said cam follower is on said handle unit, and said cam surface is on said wiper rod.

8. A portioning device as in claim 7, wherein in said cam follower is one of said rack teeth, and wherein said cam surface leads to a bottom land between two of said rod teeth.

9. A portioning device as in claim 8, wherein said handle, lever arm, rack and rack teeth are formed as a monolithic unit.

10. A portioning device as in claim 1, wherein said scoop head is releasably secured to said handle.

* * * * *